US012669185B2

(12) United States Patent
Fischer et al.

(10) Patent No.: US 12,669,185 B2
(45) Date of Patent: Jun. 30, 2026

(54) DISTRIBUTION DEVICE AND LIQUID DISTRIBUTION ACTUATOR

(71) Applicant: Vitesco Technologies GmbH, Regensburg (DE)

(72) Inventors: Matthias Fischer, Ringgau (DE); Wolf Goetze, Rotenburg (DE); Bjoern Bartholmai, Sontra (DE)

(73) Assignee: Vitesco Technologies GmbH, Regensberg (DE)

( * ) Notice: Subject to any disclaimer, the term of this patent is extended or adjusted under 35 U.S.C. 154(b) by 169 days.

(21) Appl. No.: 18/606,134

(22) Filed: Mar. 15, 2024

(65) Prior Publication Data

US 2024/0309957 A1 Sep. 19, 2024

Related U.S. Application Data

(63) Continuation of application No. PCT/EP2022/075915, filed on Sep. 19, 2022.

(30) Foreign Application Priority Data

Sep. 29, 2021 (DE) ..................... 10 2021 210 883.0

(51) Int. Cl.
F16K 11/074 (2006.01)
B60S 1/48 (2006.01)
(52) U.S. Cl.
CPC ............. *F16K 11/0743* (2013.01); *B60S 1/48* (2013.01)
(58) Field of Classification Search
CPC .... F16K 11/074; F16K 11/0743; B60S 1/481; B60S 1/48
See application file for complete search history.

(56) References Cited

U.S. PATENT DOCUMENTS 986,284 A * 3/1911 Harkins .............. F16K 11/0743
137/625.21
2,451,678 A * 10/1948 Johnson .............. F16K 11/0743
D23/245
(Continued)

FOREIGN PATENT DOCUMENTS

CN 111645635 A * 9/2020 ............... B05B 7/00
DE 759334 C 5/1952
(Continued)

OTHER PUBLICATIONS

European Search Report dated Jan. 9, 2023 for corresponding European Patent Application No. PCT/EP2022/075915.

*Primary Examiner* — David Colon-Morales

(57) ABSTRACT

A distributing device having a housing having an inlet connection and a plurality of outlet connections, and an electromotively drivable, rotatably adjustable distributor which is arranged therein in the form of a disk, on which a liquid receiving and liquid guiding device is formed. The distributing disk is rotatably adjustable into defined positions relative to the housing. The liquid receiving and liquid guiding device includes a front radial groove which controls the liquid to the desired locations of the distributing device. The radial groove is in the form of an open profile and extends from an external face, on the radial circumference, of the distributing disk into the distributing disk. The inlet connection supplies pressurized liquid to a radial gap which the distributing disk forms with the housing at the radial circumference and which guides the liquid to the radial groove. A liquid-distributing actuator includes such a distributing device.

8 Claims, 5 Drawing Sheets

(56)          References Cited

U.S. PATENT DOCUMENTS

| | | | | | |
|---|---|---|---|---|---|
| 2,988,108 | A * | 6/1961 | Malmquist | .......... | F16K 11/0743 |
| | | | | | 251/316 |
| 3,014,499 | A * | 12/1961 | Barksdale | ........... | F16K 11/0743 |
| | | | | | 137/625.23 |
| 3,045,702 | A * | 7/1962 | Nakata | ................... | G01N 30/20 |
| | | | | | 137/625.48 |
| 3,385,321 | A * | 5/1968 | Ehrens | ................ | F16K 11/0743 |
| | | | | | 251/188 |
| 4,205,821 | A * | 6/1980 | Cyphelly | ............ | F16K 11/0743 |
| | | | | | 137/625.46 |
| 4,665,947 | A * | 5/1987 | Ito | ........................ | F16K 11/0743 |
| | | | | | 137/625.2 |
| 6,932,112 | B2 * | 8/2005 | Bradford, III | ........ | F16K 11/074 |
| | | | | | 137/554 |
| 7,316,384 | B2 * | 1/2008 | Sekiya | ................ | F16K 11/0743 |
| | | | | | 251/129.11 |
| 8,555,679 | B2 * | 10/2013 | Schulze | ................... | D06F 39/02 |
| | | | | | 68/17 R |
| 8,613,293 | B2 * | 12/2013 | Bolgar | ................ | F16K 11/0743 |
| | | | | | 137/625.46 |
| 8,813,784 | B2 * | 8/2014 | Minamizawa | .......... | F25B 41/26 |
| | | | | | 251/185 |
| 9,109,710 | B2 * | 8/2015 | Hasse | .................... | D06F 39/022 |
| 9,109,824 | B2 * | 8/2015 | Pawlik | ..................... | F25B 41/31 |
| 9,803,759 | B2 * | 10/2017 | Bachofer | ............ | F16K 11/0743 |
| 10,093,145 | B1 * | 10/2018 | Vaughan | .............. | B60G 21/106 |
| 10,487,857 | B2 * | 11/2019 | Elgamil | ................ | F16K 39/045 |
| 12,214,326 | B2 * | 2/2025 | Dyer | ........................ | B01F 23/49 |
| 2010/0032603 | A1 * | 2/2010 | Wilen | .................... | G01N 30/20 |
| | | | | | 251/208 |
| 2015/0158058 | A1 * | 6/2015 | Saier | ..................... | B08B 9/0322 |
| | | | | | 137/15.04 |
| 2015/0233483 | A1 | 8/2015 | Bachofer | | |
| 2019/0136988 | A1 * | 5/2019 | Mizuno | .................. | B60S 1/481 |
| 2021/0179029 | A1 * | 6/2021 | Yamauchi | ......... | F16K 31/52466 |

FOREIGN PATENT DOCUMENTS

| | | | | | |
|---|---|---|---|---|---|
| DE | 3506631 | A1 * | 9/1985 | | |
| DE | 3840621 | A1 * | 6/1990 | ................ | B60S 1/48 |
| DE | 102016120642 | A1 * | 5/2018 | .............. | B60S 1/481 |
| DE | 102017121205 | A1 * | 3/2019 | .............. | F16K 11/16 |
| DE | 102019127132 | A1 * | 4/2021 | ........... | F16K 27/045 |
| DE | 102020202570 | A1 * | 9/2021 | ........... | B05B 7/2491 |
| EP | 3153361 | A1 * | 4/2017 | .............. | B60S 1/481 |
| JP | 2000130613 | A * | 5/2000 | | |
| WO | WO-2007101416 | A1 * | 9/2007 | .............. | F16K 3/10 |
| WO | WO-2014072379 | A1 * | 5/2014 | ........... | F16K 11/0743 |
| WO | WO-2022156894 | A1 * | 7/2022 | ................ | B60S 1/56 |

* cited by examiner

DISTRIBUTION DEVICE AND LIQUID DISTRIBUTION ACTUATOR

CROSS-REFERENCE TO RELATED APPLICATIONS

This application claims priority to PCT Application PCT/EP2022/075915, filed Sep. 19, 2022, which claims priority to German Patent Application No. DE 10 2021 210 883.0, filed Sep. 29, 2021. The disclosures of the above applications are incorporated herein by reference.

FIELD OF THE INVENTION

The invention relates to a distributing device for a liquid-distributing actuator and to a liquid-distributing actuator with such a distributing device.

SUMMARY OF THE INVENTION

It is an object of the invention to improve a distribution of water for a vehicle cleaning arrangement, specifically in view of the increasing number of vehicle sensors.

This object is achieved by way of a distributing device proposed. Furthermore, a liquid-distributing actuator with such a distributing device is proposed. Furthermore, a cleaning device and a vehicle are proposed. Additional embodiments of the invention are the subject matter described.

A distributing device for supplying a pressurized liquid to individual cleaning locations of a vehicle is proposed.

In this case, the distributing device has a housing having an inlet connection and a plurality of outlet connections and an electromotively drivable, rotatably adjustable distributor which is arranged therein in the form of a disk, on which a liquid receiving and liquid guiding device is formed.

In this instance, the distributing disk is rotatably adjustable into defined positions relative to the housing in order to allow a liquid supply via the individual outlet connections.

The liquid receiving and liquid guiding device includes in this case a front radial groove or a front radial channel which controls or guides the liquid to the desired locations of the distributing device.

In this case, the radial groove is in the form of an open profile and extends from an external face, on the radial circumference, of the distributing disk into the distributing disk.

In this case, the radial groove may further be in the form of a so-called radial through-groove which extends per se between two front faces of the distributing disk or from front side to front side of the distributing disk, that is to say, in a longitudinal direction of the distributing disk through the distributing disk or over the entire height or thickness thereof.

Alternatively, at both sides of the distributing disk or on the front side of the distributing disk there may be provided one radial groove which extends only over a specific extent into the distributing disk. That is to say that these two radial grooves are opposite each other and are separated from each other by a wall of the distributing disk between them.

In this case, the inlet connection supplies pressurized liquid to a radial gap which the distributing disk forms with the housing at the radial circumference and which guides or controls the liquid to the radial groove.

This proposed water-distributing mechanism minimizes the torque which has to be applied by an electric motor in order to adjust the distributing disk.

This proposed water-distributing mechanism further simplifies a vehicle cleaning device or a vehicle cleaning system and consequently reduces the costs involved because liquid conveying pumps and valve blocks with separately actuatable valves may thereby be saved. There is consequently also an associated weight saving. Since conveying pumps are saved on, corresponding pump activation is also simplified.

Furthermore, this proposed water-distributing mechanism reduces cleaning liquid consumption. This in turn is manifest in an increase in a range of a vehicle that is achieved as such with one filling of a cleaning liquid container or tank. This applies to future fully autonomously driving vehicles which, compared to previous vehicles, have a significantly greater number of sensors-including safety-relevant sensors-whose functionality must be ensured.

Furthermore, the saving of required apparatus or system components also promotes corresponding compactness of such an apparatus or of such a system, such that overall less installation space is required.

Here, a cleaning location is understood to mean a cleaning location assigned to a vehicle sensor. Here, this cleaning location need not itself be part of the sensor, but may be arranged spaced apart therefrom, for example a location on a windshield or the like. The cleaning location may however also be part of a vehicle sensor, for example a cleaning location assigned to a camera. A cleaning location may however also be another location of the vehicle which is not associated with a vehicle sensor as such, for example another location on the windshield, a location on a headlight and the like.

Here, in the simplest case, a liquid or cleaning liquid may be understood to mean water, or an aqueous cleaning agent solution, that is to say, water in combination with a cleaning agent additive. Here, the cleaning agent solution may also contain an antifreeze agent, which as such lowers the freezing point of the cleaning agent solution.

The inlet connection may in this case be arranged at the height of the radial gap. In this case, the inlet connection directly or immediately supplies the pressurized liquid to the radial gap. It is thereby possible to even further reduce the torque which has to be applied by an electric motor in order to adjust the distributing disk. Furthermore, the direct or immediate action on the radial gap brings about an even more compact configuration of the distributing device so that overall even less structural space is required.

During operation of the distributing device, the distributing disk forms at the front with the associated housing portion or housing section a defined axial gap, via which conveyed liquid is propagated in the housing and in this instance forms at the front a liquid leakage film or a liquid leakage flow which spaces the distributing disk away from the housing.

In this case, the distributing disk is configured without seals—that is to say, without a separate sealing element or without separate sealing elements—with respect to the housing. It is therefore proposed that a return of liquid to a tank be provided. To this end, a coherent space which is filled by conveyed liquid during operation of the distributing device between the distributing disk and the housing is connected to a return connection on the housing in fluid terms.

In this case, the distributing disk forms over at least one closed, circumferential front face which forms a collar and the housing portion which is associated therewith a so-called minimum axial gap—in the manner of a sealing gap—but which is associated with the above-mentioned liquid leakage film or the above-mentioned liquid leakage flow. This at least one front face acts in the manner of a sealing face in this case.

It is further proposed that the distributing disk be configured in a symmetrical or mirror-symmetrical manner with respect to an axis orthogonal to the longitudinal axis of the distributing disk in order to be able to produce a hydrostatic equilibrium in the housing or on the distributing disk.

In this case, it is proposed that the distributing disk be provided at the front with at least one pressure equalizer in the form of a recess in order to be able to generate the hydrostatic equilibrium.

Additionally or alternatively, it is proposed that the distributing disk be provided at the front with pressure equalizer in the form of through-holes in order to be able to generate the hydrostatic equilibrium.

There is further proposed a liquid-distributing actuator which includes a distributing device or distribution device of the type described above and an electric motor for driving the rotatably adjustable distributor of the distributing device.

Furthermore, there is proposed a cleaning device or a cleaning system for a vehicle for cleaning a large number of cleaning locations on the vehicle, wherein the cleaning device or the cleaning system includes at least one liquid-distributing actuator of the type described above.

In addition, a vehicle having a cleaning device of the type described above is also proposed.

A vehicle is to be understood here to mean any type of vehicle which is operated by combustion engine and/or electric motor, such as passenger motor vehicles and/or utility vehicles. These are partially autonomously and or fully autonomously operated vehicles.

The invention will be explained in detail below with reference to the illustrations in the Figures. Further advantageous refinements of the invention emerge from the description below of preferred embodiments.

BRIEF DESCRIPTION OF THE DRAWINGS

In this Respect.

DETAILED DESCRIPTION OF THE PREFERRED EMBODIMENTS

The following description of the preferred embodiment(s) is merely exemplary in nature and is in no way intended to limit the invention, its application, or uses.

The proposed liquid-distributing actuator A serves to supply individual cleaning locations (RS=cleaning location; $RS_i$, $RS_{i+1}$, . . . , $RS_{i+n}$) of a vehicle with a pressurized liquid or cleaning liquid.

Figure 1:
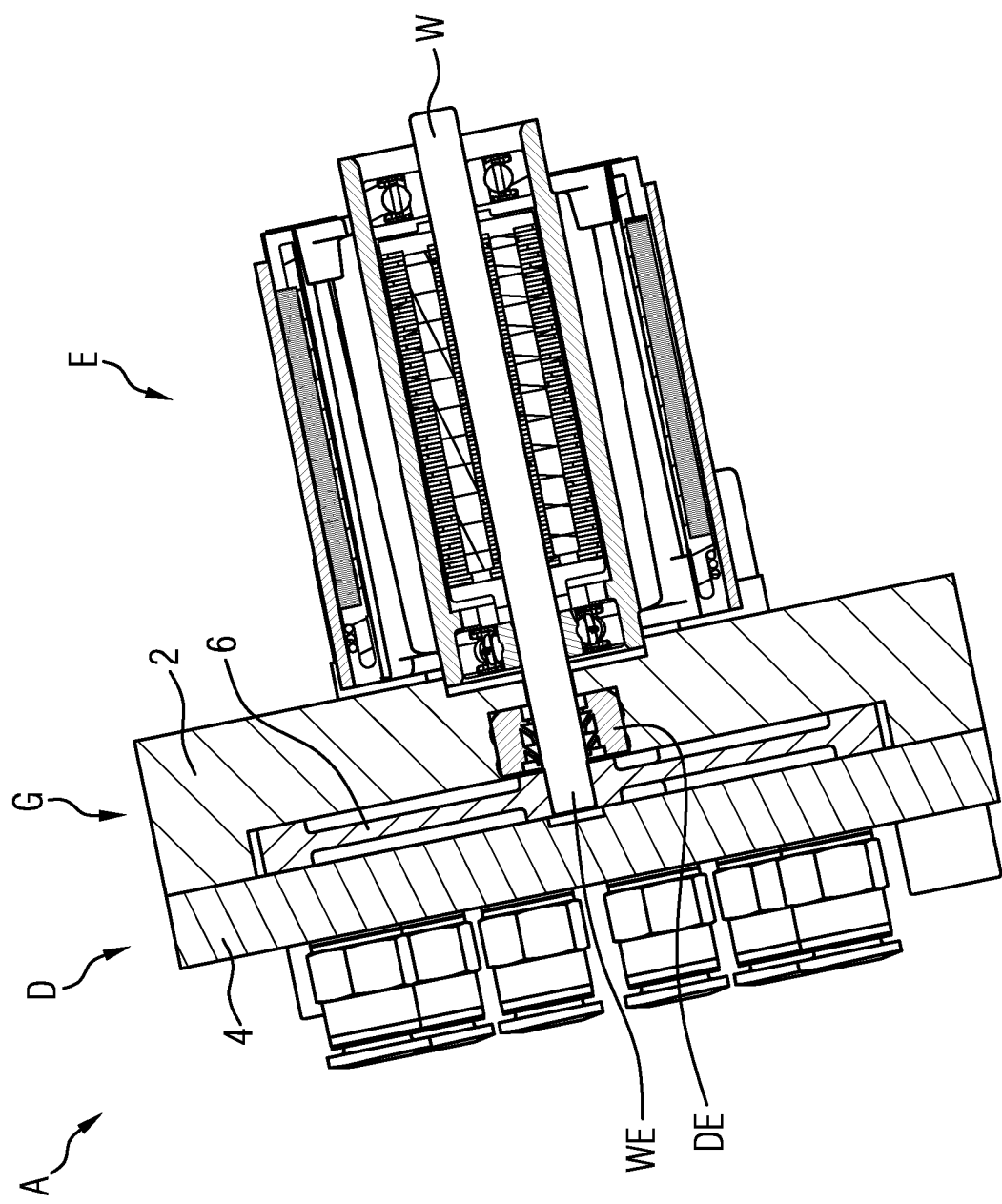
FIG. 1 shows a proposed liquid-distributing actuator as a sectioned view.

In this case, the actuator A includes a distributing or distribution device D having a, for example, substantially cylindrical housing G which has, for example, a first housing portion 2 and a second housing portion 4. These two housing portions 2, 4 form in this case in the joined state a housing chamber, in which a distributor 6 in the form of a disk is arranged in a rotatably adjustable manner (FIG. 1). The two housing portions 2, 4 and the distributing disk 6 are produced in this case, for example, from a duroplastic plastics material or a thermoplastic plastics material, for instance, a PPS-GF material.

Figure 2:
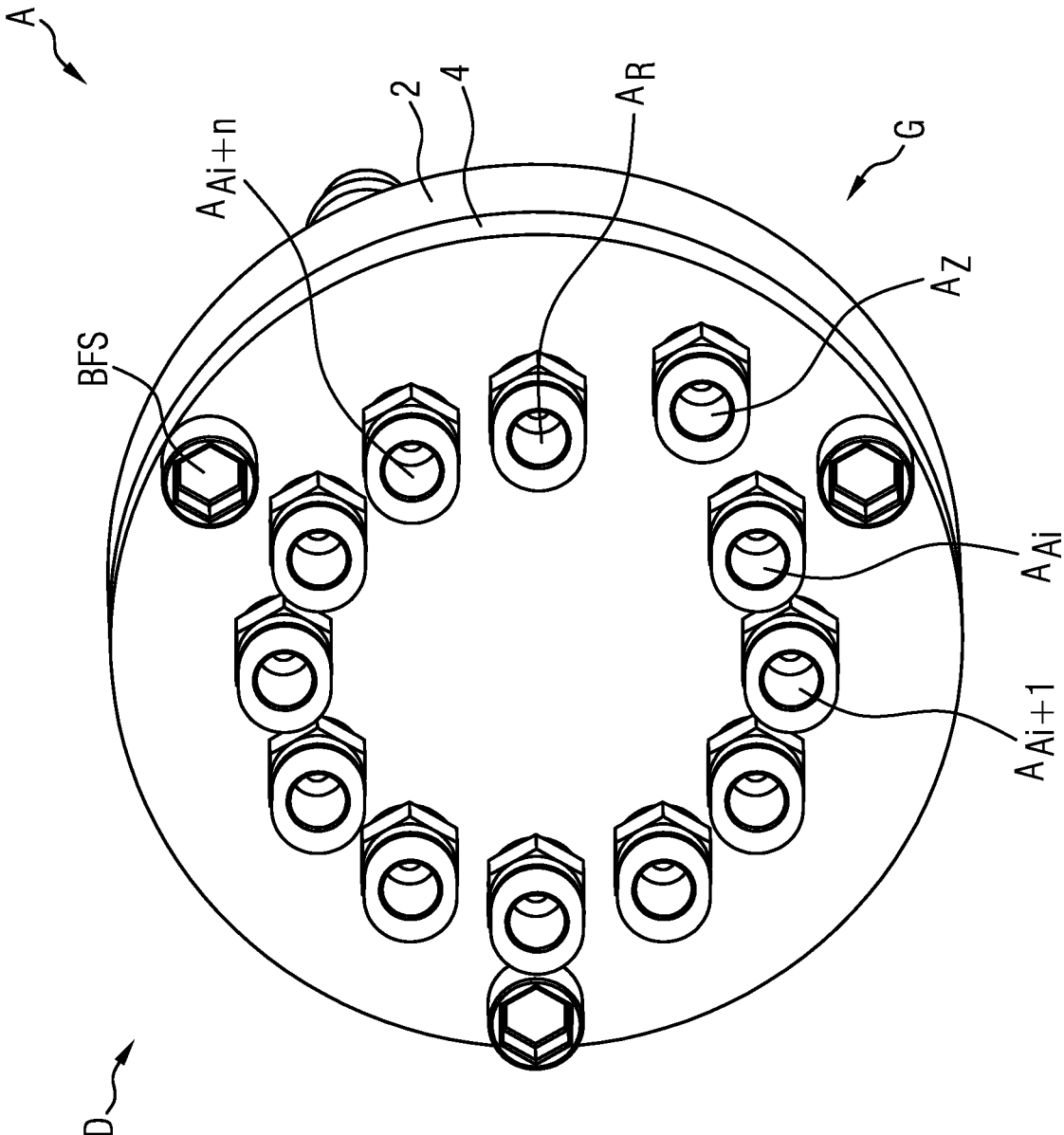
FIG. 2 shows the actuator shown in FIG. 1 in a first perspective view.
Figure 3:
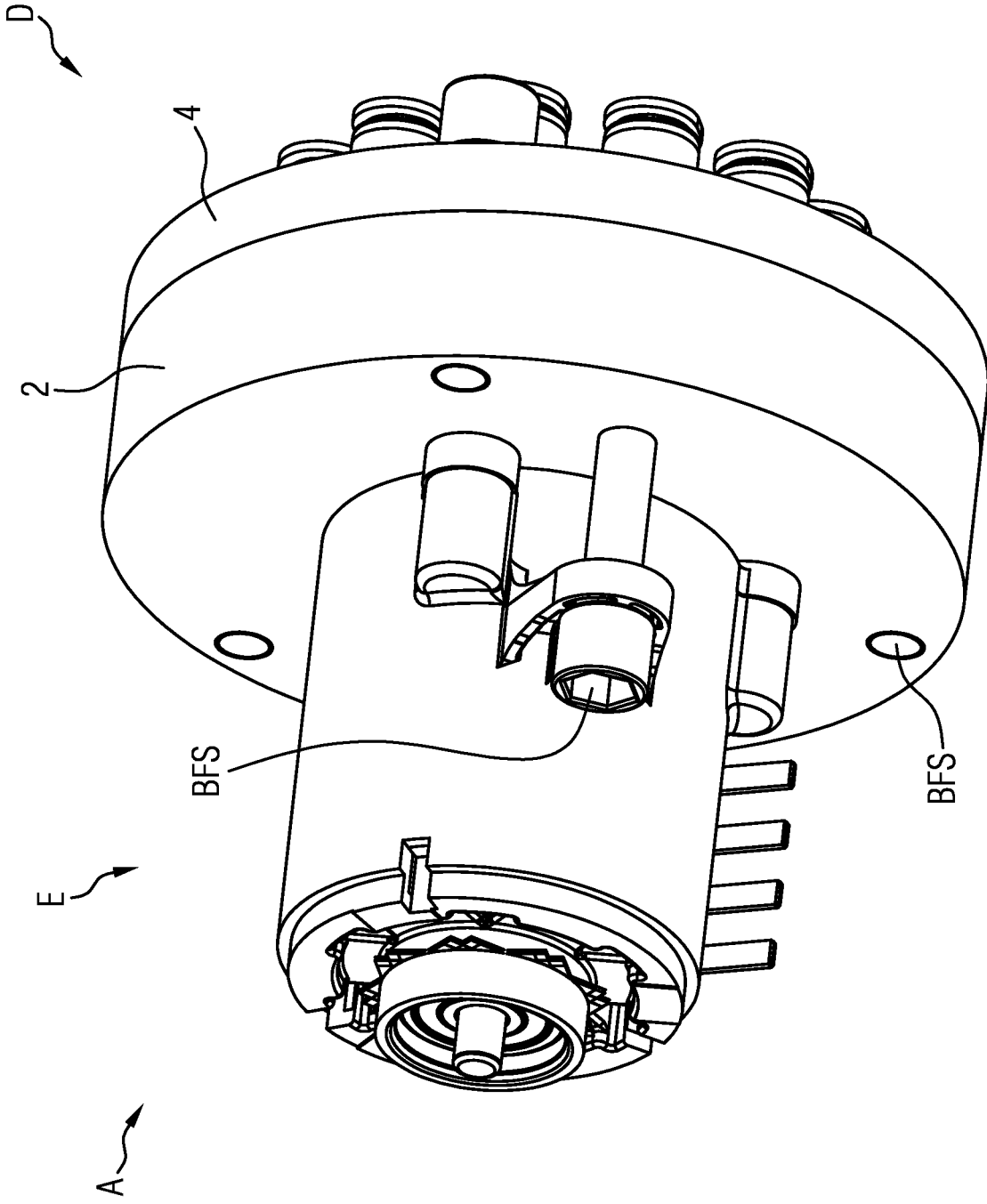
FIG. 3 shows the actuator shown in FIG. 1 in a second perspective view.

The actuator A further includes an electric motor or E-motor E which is joined to the housing portion 2 and which is screwed by securing screws BFS (see FIG. 3). However, the housing portion 4 is screwed to the housing portion 2 by fixing screws BFS (see FIG. 2 or FIG. 3). Alternatively to screwing, for example, it is also possible to roll these housing portions 2, 4 with respect to each other, for example, by use of a sheet metal covering. Such rolling could in this case also include, for example, the electric motor E. The electric motor E is in this case, for example, in the form of a dry rotor. Alternatively, the electric motor E may also be in the form of a wet rotor and in this case may have a containment shell or a can which separates a wet chamber from a dry chamber and in which the rotor of the electric motor E is flushed or flowed around by conveyed liquid (wet chamber). However, the stator of the electric motor E is located in this instance in the dry chamber. A shaft W of the electric motor E extends in this case through the housing portion 2 and a sealing element DE which is arranged in the housing portion 2 and which in this case seals with respect to the housing portion 2 and the shaft W as far as the distributor 6 or the distributing disk 6, wherein the shaft end WE engages in the distributing disk 6 in a positive-locking manner (FIG. 1).

FIG. 2 illustrates the end, at the hydraulic connection side, of the actuator A which includes a large number of hydraulic connections. In detail, this end includes an inlet connection $A_z$, a plurality of outlet connections $A_{RSi}$, $A_{RSi+1}$, . . . , $A_{RSi+n}$—in accordance with the number of above-mentioned cleaning locations $RS_i$, $RS_{i+1}$, . . . , $RS_{i+n}$ of the vehicle—and an additional outlet connection in the form of a return connection $A_R$. In this case, FIG. 2 further illustrates individual hydraulic connection elements which are screwed, for example, into a corresponding threaded hole of the housing portion 4.

FIG. 3 further illustrates the electromotive portion of the actuator A and the end, at the electrical connection side, of the actuator A with electrical contacts or pins.

Figure 4:
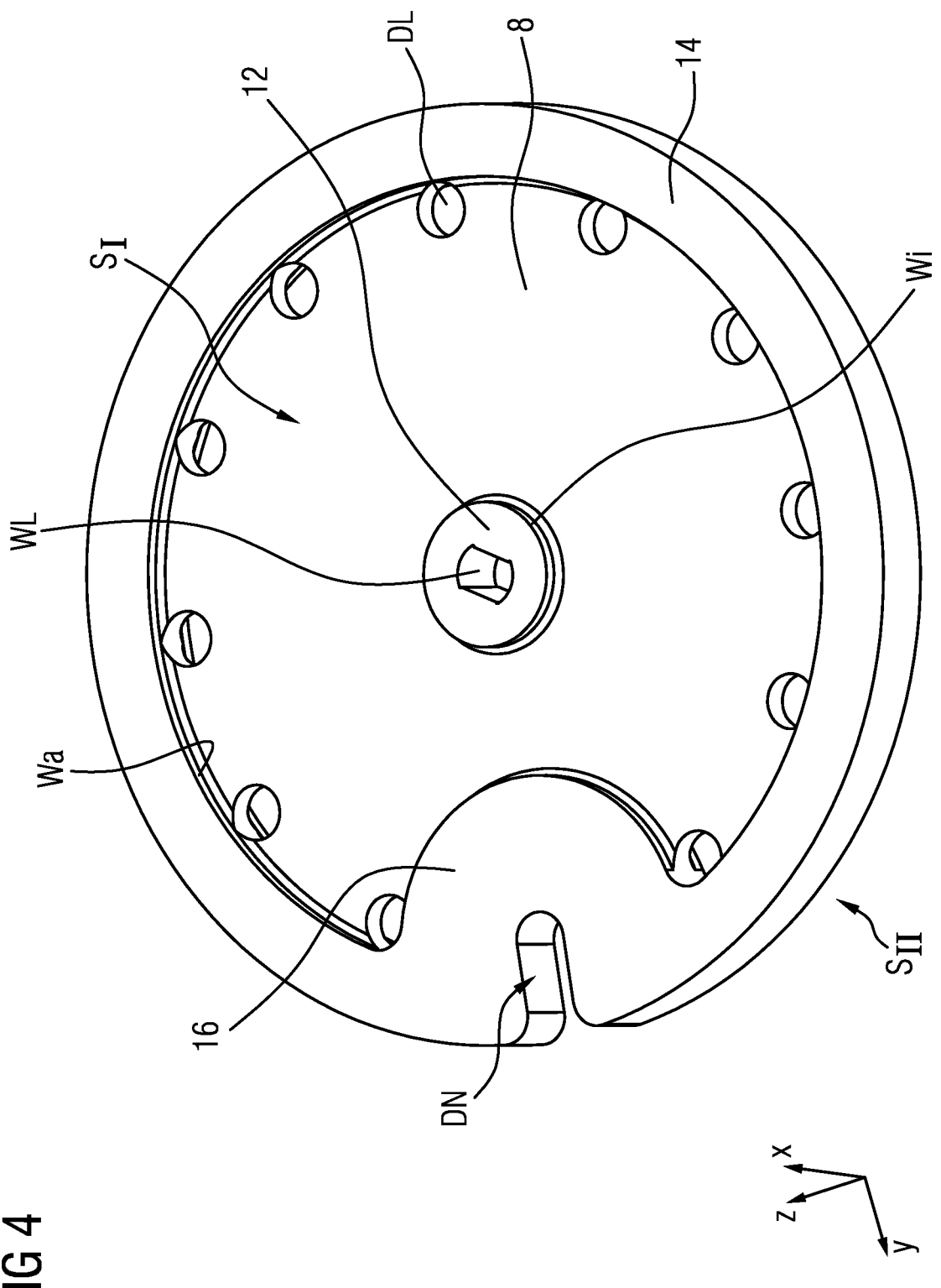
FIG. 4 shows the actuator shown in FIG. 1 in a perspective view.

FIG. 4 illustrates the above-mentioned distributor 6 which is in the form of a disk. The two front sides $S_I$, $S_{II}$ of the distributing disk 6 are configured to be identical in this case, that is to say, symmetrical or mirror-symmetrical with respect to an axis Y-Y or Z-Z orthogonal to the longitudinal axis X-X of the distributing disk 6 in order to be able to generate during operation of the actuator A a hydrostatic equilibrium or a hydrostatic pressure compensation—in the direction X-X—at the distributing disk 6 or inside the housing G, 2, 4. Consequently, the distributing disk 6 remains with spacing from the housing portions 2, 4 during operation of the distributing device D.

In this case, the distributing disk 6 has at the front a first—external—closed, circumferential front face 14, 16 and a second—internal—closed, circumferential front face 12 around the shaft hole WL, in which the complementarily configured shaft end WE (FIG. 1) engages in a positive-locking manner. In this case, these two front faces 12 and 14, 16 are located, for example, at a height and further form during operation of the distributing device D, with respect to the associated housing portions or housing sections 2, 4, a so-called minimum axial gap, via which the conveyed liquid propagates in the housing chamber.

These two front faces 12 and 14, 16—which each form a closed collar—are also referred to as sealing faces of the distributing disk 6 which define or form correspondingly fluid-tight or the mentioned minimum axial gap with respect to the associated housing portions or housing sections 2, 4.

In the exemplary embodiment illustrated in the Figures, the total sealing face of the distributing disk 6 extends in a radial direction overall over at least approximately from 8 mm to 10 mm. That is to say, the total sealing length of the distributing disk 6 in a radial direction is overall at least approximately from 8 to 10 mm.

In one embodiment, the mentioned first-external-closed, circumferential front face 14, 16 extends in a radial direction of the distributing disk 6 around already at least approximately from 8 to 10 mm. That is to say, the total sealing length of this external front face 14, 16 in a radial direction of the distributing disk 6 is already at least approximately from 8 to 10 mm.

There is provided between these two front faces 12 and 14, 16 an additional third and recessed closed, circumferential front face 8 which forms per se a recess in the form of an indentation or an exposed, coherent region which is further delimited by an external closed, circumferential wall $W_a$ of the distributing disk 6 and an internal closed, circumferential wall $W_i$ of the distributing disk 6. This extensive and exposed region in comparison with the first and second front face 12 and 14, 16 takes up a large part of the required liquid volume and is used in this case for the hydrostatic pressure equalization.

Furthermore, there extend through the distributing disk 6 at the front a plurality of through-holes DL which all contribute to forming the hydrostatic equilibrium. In this case, these through-holes DL are located in the exposed region and in this instance, for example, adjacent to the external wall $W_a$.

Except for a region 16 around a radial through-groove DN which is formed, for example, in a substantially semicircular manner around the radial through-groove DN, and which also forms the mentioned first, external front face 14, 16 of the distributing disk 6, the through-holes DL are arranged at identical intervals relative to each other in order to promote the hydrostatic pressure equalization.

In this instance, the radial through-groove DN is open in the direction toward the radially circumferential outer face of the distributing disk 6 or merges therein. The transition from this outer face into the radial through-groove DN is, for example, of convex form in this instance.

At the two housing portions 2, 4, at least one recess in the form of an indentation may also be formed at the two housing portions 2, 4 at the front and facing the distributing disk 6, and per se contributes—in connection with the facing front recess of the distributing disk 6—to forming a balanced hydraulic bearing of the distributing disk 6 over the entire adjustment range thereof or ensures such a hydraulic bearing. These additional indentations or recesses in the housing portions 2, 4 are configured or formed in this case identically and are further located precisely opposite each other.

In another embodiment, either only the housing portion 2 or only the housing portion 4 is configured with at least one such indentation in the form of a recess at the front side and facing the distributing disk 6.

In another embodiment, in addition a groove which per se connects in fluid terms the radial gap RS between the circumferential side of the distributing disk 6 or the radially circumferential outer face of the distributing disk 6 and the housing G, 2, 4 to the return connection $A_R$ is configured at the front side and facing the distributing disk 6 on the housing portion 2 and/or on the housing portion 4. Such a groove brings about a pressure reduction in a so-called flushing position or flushing location or neutral position or neutral location of the distributing disk 6, wherein the flushing position and neutral position are further described below.

In another alternative embodiment, the housing G further includes a closed, circumferential spacer ring which per se is arranged between the housing portion 2 and the housing portion 4 and which spaces these two housing portions 2, 4 away from each other. This spacer ring also forms the housing chamber which receives the distributing disk 6 in this case.

Figure 5:
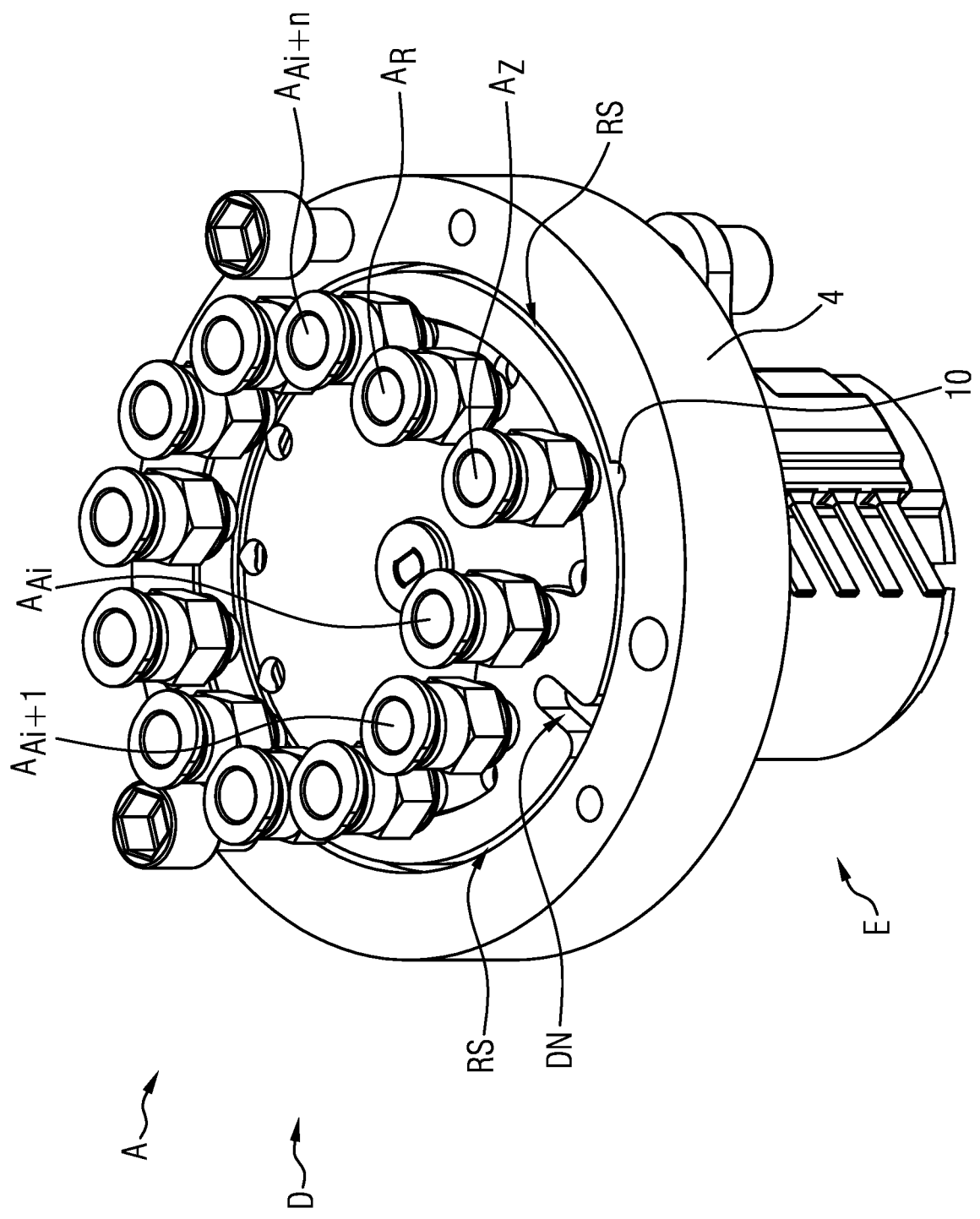
FIG. 5 shows the actuator shown in FIG. 1 in a third perspective view.

FIG. 5 illustrates the distributing device D with the housing portion 4 being omitted in order to show the distributing disk 6 in the installed position thereof. In this instance, inter alia it is possible to see the radial gap RS and the radial through-groove DN which is open per se toward the radial gap RS. It is also seen that the inlet connection $A_z$ is at the height of the radial gap RS and in this case at the same time above a projection 10, which expands the radial gap RS slightly locally, of the housing portion 2.

The functioning of the proposed distributing mechanism is described below.

During operation of the actuator A, the distributor 6 or the distributing disk 6 is flushed or flowed around by conveyed liquid inside the space, which receives it, of the housing G, 2, 4.

The distributing device D is supplied or fed with a pressurized liquid via the inlet connection $A_z$. The inlet connection $A_z$ is located in this case at the height of the radial gap RS (cf. FIG. 2 in connection with FIG. 5) so that the liquid strikes the radial gap RS via which it is then distributed over the entire housing chamber. In this case, the liquid flows as far as the radial through-groove DN which forms per se an open profile in the distributing disk 6 and which is open toward the radial gap RS and via which the liquid is guided or controlled to the desired location of the distributing device D depending on the orientation or rotational adjustment of the distributing disk 6.

Via the two axial gaps which the distributing disk 6 forms at the front side with the associated housing portion 2, 4 in a defined manner, the liquid spreads over the respective front side $S_I$, $S_{II}$ and forms in this case a liquid leakage film at the front side or a liquid leakage flow at the front side which accordingly spaces the distributing disk 6 away from the associated housing portion 2, 4. In this case, the liquid travels through the through-holes DL as far as the mutually opposite front sides $S_I$, $S_{II}$ of the distributing disk 6.

Depending on the orientation or rotational adjustment of the distributing disk 6, either one of the mentioned cleaning locations of the vehicle is supplied with liquid by one of the outlet connections $A_{RSi}$, $A_{RSi+1}$, . . . , $A_{RSi+n}$ being acted on accordingly via the radial through-groove DN, or the liquid supply is completely prevented by the distributing disk 6 taking up a so-called flushing position or flushing location. In the latter case, the distributing disk 6 is orientated with respect to the housing G, 2, 4 in such a manner that the liquid acts directly on the return connection $A_R$ (FIG. 2), via which it is returned to a liquid tank, out of which it was previously conveyed.

In this flushing position, the conveyed liquid is recirculated in a circuit of a cleaning device of the vehicle, to which the liquid-distributing actuator A belongs. In this case, the distributing device D and the cleaning device are cleaned and/or vented. In this case, a minimal pressure level is further produced in the housing chamber mentioned.

Furthermore, an additional position—a so-called neutral position or neutral location—may also be provided for the distributing disk 6, in which the distributing disk 6 is rotatably adjusted and in which the radial through-groove DN acts on a position between the return connection $A_R$ and the supply connection $A_z$ (cf. FIG. 2) In this neutral position, the liquid supply is also prevented via the individual outlet connections $A_{RSi}$, $A_{RSi+1}$, . . . , $A_{RSi+n}$. In this case, there is generated in the housing chamber a maximum pressure level or a pressure level which is higher than the above-described position, in which the radial through-groove DN directly acts on the return connection $A_R$ (FIG. 2).

Both in the flushing position and in the neutral position— or also referred to as the blocking position—of the distributing disk 6, all the outlet connections $A_{RSi}$, $A_{RSi+1}$, . . . , $A_{RSi+n}$—except for the return connection $A_R$—remain closed. This is achieved by a corresponding shut-off valve (not illustrated) which opens only from a specific liquid pressure being associated with each of these outlet connections $A_{RSi}$, $A_{RSi+1}$, . . . , $A_{RSi+n}$. In this case, only the liquid leakage which is produced in the neutral position is discharged via the return connection $A_R$ or returned to the liquid tank.

These two mutually different pressure levels may be used for diagnostic purposes in this instance.

The pressure or the pressure level in the housing chamber is, for example, approximately from 3 to 8 bar in this case.

It is also possible, with the position or the location of the rotor of the electric motor E in a circumferential direction $\Delta\phi$ being determined, to determine the mentioned relative position of the radial through-groove DN in relation to the individual positions of the housing.

At least one sensor which is fitted in and/or on the electric motor E provides the mentioned position or location of the rotor in this instance, for example, a Hall sensor. Additionally or alternatively, it is also possible to use directly a current and voltage information item from the electric motor E to determine the rotor position or rotor location.

Irrespective of the position of the distributing disk 6, the liquid leakage which is produced in the housing chamber at the two axial gaps and in the radial gap is returned—at least from a specific minimum pressure level in the housing chamber—via the return connection $A_R$ (cf. FIG. 2) to the liquid tank (liquid return).

The proposed distributing mechanism is characterized during operation by minimal axial gaps at the front side, which minimize a liquid leakage in the housing chamber per se.

The produced minimum axial gaps are located in this instance in the range up to approximately 10 μm. That is to say, overall the minimum axial gap between the distributing disk 6 and the housing G, 2, 4 is consequently up to a maximum of approximately 20 μm.

The liquid volume which is reduced by these minimum axial gaps in the housing chamber further promotes in this case a high freezing protection of the distributing device D.

The symmetrical or at least substantially symmetrical distributing disk 6 is further characterized in this instance in that it is rotatably adjusted virtually without force and further has a small moment of inertia. And this involves a relatively low energy requirement and very short switching times for the rotational adjustment of the distributing disk 6.

In the exemplary embodiment illustrated in the Figures (cf. FIG. 1), the drive shaft W of the electric motor E is received or supported by a fixed bearing on the housing and a spaced-apart movable bearing at the other end of the shaft W—which may, for example, be in the form of a roller ball bearing.

Alternatively, however, it would also be possible to provide a shaft receptacle or shaft bearing, according to which the shaft end WE on the housing presses against the housing portion 4 or a ball which is arranged in the housing portion 4 and in this case forms a hydrodynamic bearing during operation of the distributing device.

In another embodiment, the housing G, 2, 4 itself may form a portion of a drive unit or an electric motor E. In this case, the distributing disk 6 may be made from a magnetic material. At least one housing portion, which surrounds the distributing disk 6, thus, for example, the housing portion 2, forms in this case the stator of the electric motor in the form of a, for example, synchronous or reluctance motor.

It would thereby be possible to configure the actuator A with the above-described distributing mechanism in an even more compact manner.

Although, in the preceding description, exemplary embodiments are explained, it may be noted that a large number of modifications are possible. It should be noted, furthermore, that the exemplary embodiments are merely examples which are in no way intended to limit the scope of protection, the applications, and the structure. Instead, the above description gives a person skilled in the art a guideline for the implementation of at least one exemplary embodiment, wherein various changes may be made, especially with regard to the function and arrangement of the component parts described, without departing from the scope of protection as apparent from the combinations of features equivalent thereto.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A distributing device having:
   a housing, further comprising:
     an inlet connection; and
     a plurality of outlet connections;
   an electromotively drivable, rotatably adjustable distributor which is arranged therein in the form of a distributing disk, on which a liquid receiving and liquid guiding device is formed, the liquid receiving and liquid guiding device further comprising:
     a front radial groove which controls the liquid to the desired locations of the distributing device, the radial groove further comprising:
       an open profile and extends from an external face, on the radial circumference of the distributing disk into the distributing disk;
   a coherent space, which is filled by conveyed liquid during operation of the distributing device between the distributing disk and the housing, and is fluidically connected to a return connection on the housing;
   wherein the distributing disk is rotatably adjustable into defined positions relative to the housing in order to allow a liquid supply via the individual outlet connections, and the inlet connection supplies pressurized liquid to a radial gap which the distributing disk forms with the housing at the radial circumference and which guides the liquid to the radial groove.

2. The distributing device of claim 1, wherein the inlet connection is arranged at a height of the radial gap.

3. The distributing device of claim 1, further comprising:

a defined axial gap formed by the distributing disk at the front with the associated housing portion during operation of the distributing device;

wherein conveyed liquid is propagated in the housing via the defined axial gap and forms a liquid leakage film at the front which spaces the distributing disk away from the housing.

4. The distributing device of claim 1, wherein the distributing disk is symmetrical with respect to an axis orthogonal to the longitudinal axis of the distributing disk.

5. The distributing device of claim 1, the distributing disk further comprising at the front at least one pressure equalizer in the form of a recess.

6. The distributing device of claim 5, the distributing disk further comprising at the front another pressure equalizer in the form of through-holes.

7. A liquid-distributing actuator comprising:

a distributing device, further comprising:

a housing, further comprising:

an inlet connection; and a plurality of outlet connections;

an electromotively drivable, rotatably adjustable distributor which is arranged therein in the form of a distributing disk, on which a liquid receiving and liquid guiding device is formed, the liquid receiving and liquid guiding device further comprising:

a front radial groove which controls the liquid to the desired locations of the distributing device, the front radial groove further comprising:

an open profile and extends from an external face, on the radial circumference of the distributing disk into the distributing disk;

a coherent space, which is filled by conveyed liquid during operation of the distributing device between the distributing disk and the housing, and is fluidically connected to a return connection on the housing;

wherein the distributing disk is rotatably adjustable into defined positions relative to the housing in order to allow a liquid supply via the individual outlet connections, and the inlet connection supplies pressurized liquid to a radial gap which the distributing disk forms with the housing at the radial circumference and which guides the liquid to the radial groove;

an electric motor for driving the rotatably adjustable distributor of the distributing device.

8. A cleaning device for a vehicle for cleaning a number of cleaning locations on the vehicle, the cleaning device further comprising at least one liquid-distributing actuator of claim 7.

* * * * *